US012744720B2

(12) United States Patent
Mermoud et al.

(10) Patent No.: US 12,744,720 B2
(45) Date of Patent: Sep. 22, 2026

(54) COMPUTING MOTIF SIGNATURES FOR QoE DISRUPTIONS

(71) Applicant: Cisco Technology, Inc., San Jose, CA (US)

(72) Inventors: Grégory Mermoud, Venthône (CH); Jean-Philippe Vasseur, Combloux (FR)

(73) Assignee: Cisco Technology, Inc., San Jose, CA (US)

( * ) Notice: Subject to any disclaimer, the term of this patent is extended or adjusted under 35 U.S.C. 154(b) by 567 days.

(21) Appl. No.: 18/127,907

(22) Filed: Mar. 29, 2023

(65) Prior Publication Data

US 2024/0333624 A1 Oct. 3, 2024

(51) Int. Cl.
*H04L 43/10* (2022.01)

(52) U.S. Cl.
CPC .................................... *H04L 43/10* (2013.01)

(58) Field of Classification Search
CPC ........ H04L 43/10; H04L 43/087; H04L 43/12
See application file for complete search history.

(56) References Cited

U.S. PATENT DOCUMENTS 10,581,664 B1 3/2020 Peng et al.
11,240,131 B2 2/2022 Su et al.
11,438,781 B2 9/2022 Lau et al.
11,539,573 B2 12/2022 Shirvani et al.
2015/0109942 A1* 4/2015 Nguyen .................. H04L 43/12 370/252
2015/0188780 A1* 7/2015 Spieser ................... H04L 43/55 370/252
2015/0341812 A1* 11/2015 Dion .................. H04N 21/6373 370/252
2019/0379589 A1 12/2019 Ryan et al.
2020/0296023 A1* 9/2020 Kumar .................. H04L 43/103
2020/0382387 A1* 12/2020 Pasupathy ............... H04L 41/40
2021/0083948 A1* 3/2021 Paruchuri ........... H04L 47/6215
2021/0211347 A1* 7/2021 Vasseur ............... H04L 43/0876
2021/0226856 A1 7/2021 Sridhar et al.
2021/0306244 A1* 9/2021 Malinskiy ........... H04L 43/0858
2021/0399964 A1* 12/2021 Gupta ...................... G06N 3/09
2024/0267310 A1* 8/2024 Bhat ................... H04L 43/0829
2025/0274370 A1* 8/2025 Diot ........................ H04L 43/12

* cited by examiner

*Primary Examiner* — Schquita D Goodwin
(74) *Attorney, Agent, or Firm* — Lee & Hayes, P.C.

(57) ABSTRACT

In one embodiment, a device obtains a set of probing motifs. Each probing motif groups similar patterns of path probing results for one or more path metrics in a network. The device generates signatures for the set of probing motifs. Each signature relates a probing strategy with a measure of performance of a classifier to detect that motif were path probing to be conducted in accordance with that probing strategy. The device selects, based on the signatures for the set of probing motifs, a particular probing strategy to use in the network. The device causes one or more probing agents in the network to conduct path probing in accordance with the particular probing strategy.

20 Claims, 13 Drawing Sheets

710

COMPUTING MOTIF SIGNATURES FOR QoE DISRUPTIONS

TECHNICAL FIELD

The present disclosure relates generally to computer networks, and, more particularly, to computing motif signatures for quality of experience (QoE) disruptions.

BACKGROUND

As more applications migrate to the cloud, such as through software-as-a-service (SaaS) platforms, network administrators are now placing greater emphasis on the quality of experience (QoE) afforded to users of these applications. Traditionally, network administrators have set service level agreements (SLAs) as proxies for the true QoE of an application. However, more recent approaches to optimizing the QoE of an online/SaaS application through control of the network now rely on machine learning to better understand the relationships between the behaviors of the network and the QoE of a given application.

To observe the behaviors of the network, path probing is often used whereby packets are sent via a network path to allow probing agents in the network to measure path metrics such as packet loss, delays, jitter, and the like. There is also a connection between the probing strategy used by these probing agents and the ability of a monitoring system to identify certain behavioral patterns that may indicate degraded QoE of an application. For instance, selecting a probing frequency that is too slow may simply lead the system to miss a pattern that results in users perceiving a drop in the QoE of the application.

Of course, a naïve approach to detecting behavioral patterns in a network would be to simply send probes at a high frequency, continuously. However, this is also not practical in many networks due to resource constrains both at the device level, as well as at the network level. Indeed, the more probes that are sent, the lower the bandwidth that is available for the traffic of the application and could even result in the probing itself causing degradation of its QoE, in some instances.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
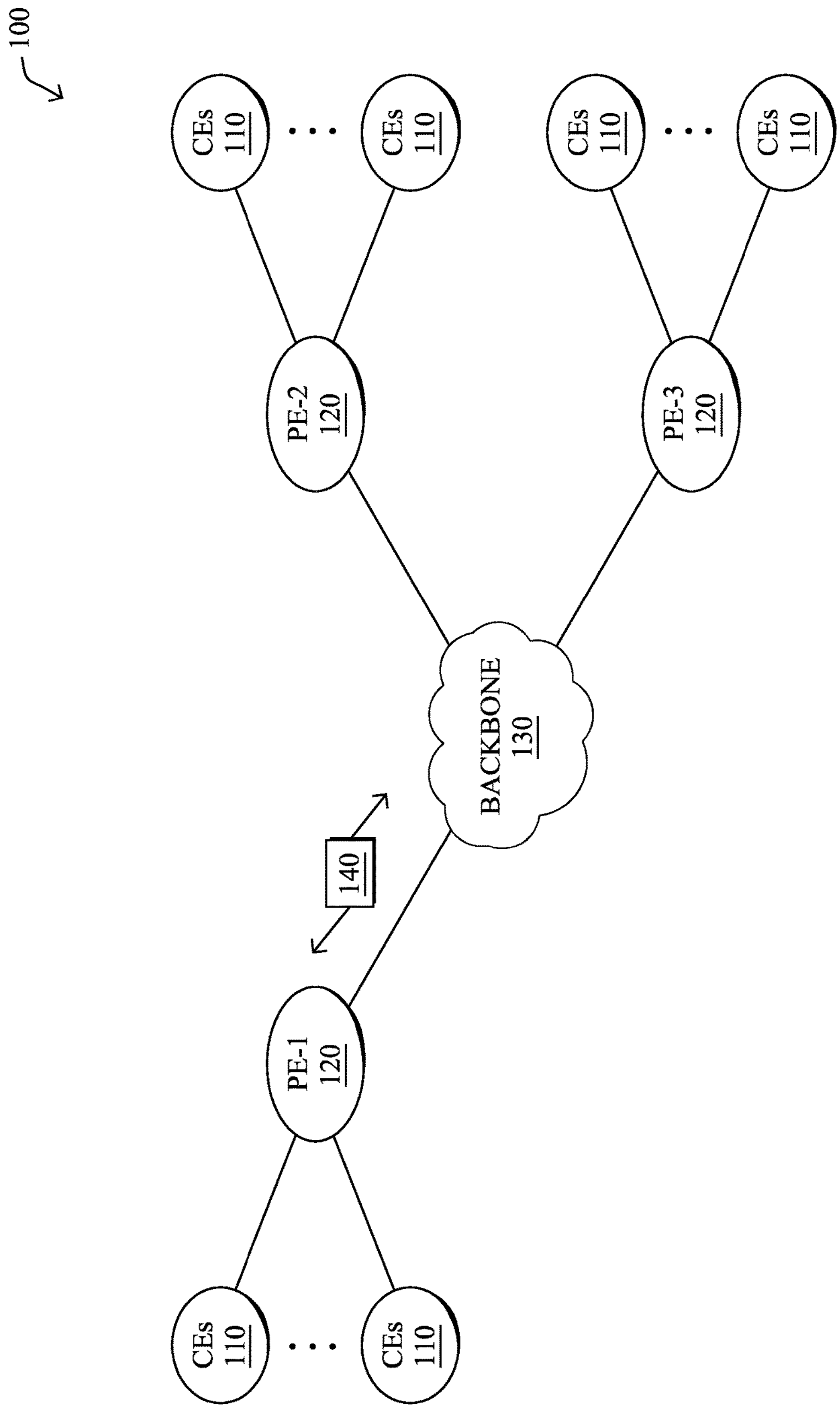
FIGS. 1A-1B illustrate an example communication network.

According to one or more embodiments of the disclosure, a device obtains a set of probing motifs. Each probing motif groups similar patterns of path probing results for one or more path metrics in a network. The device generates signatures for the set of probing motifs. Each signature relates a probing strategy with a measure of performance of a classifier to detect that motif were path probing to be conducted in accordance with that probing strategy. The device selects, based on the signatures for the set of probing motifs, a particular probing strategy to use in the network. The device causes one or more probing agents in the network to conduct path probing in accordance with the particular probing strategy.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
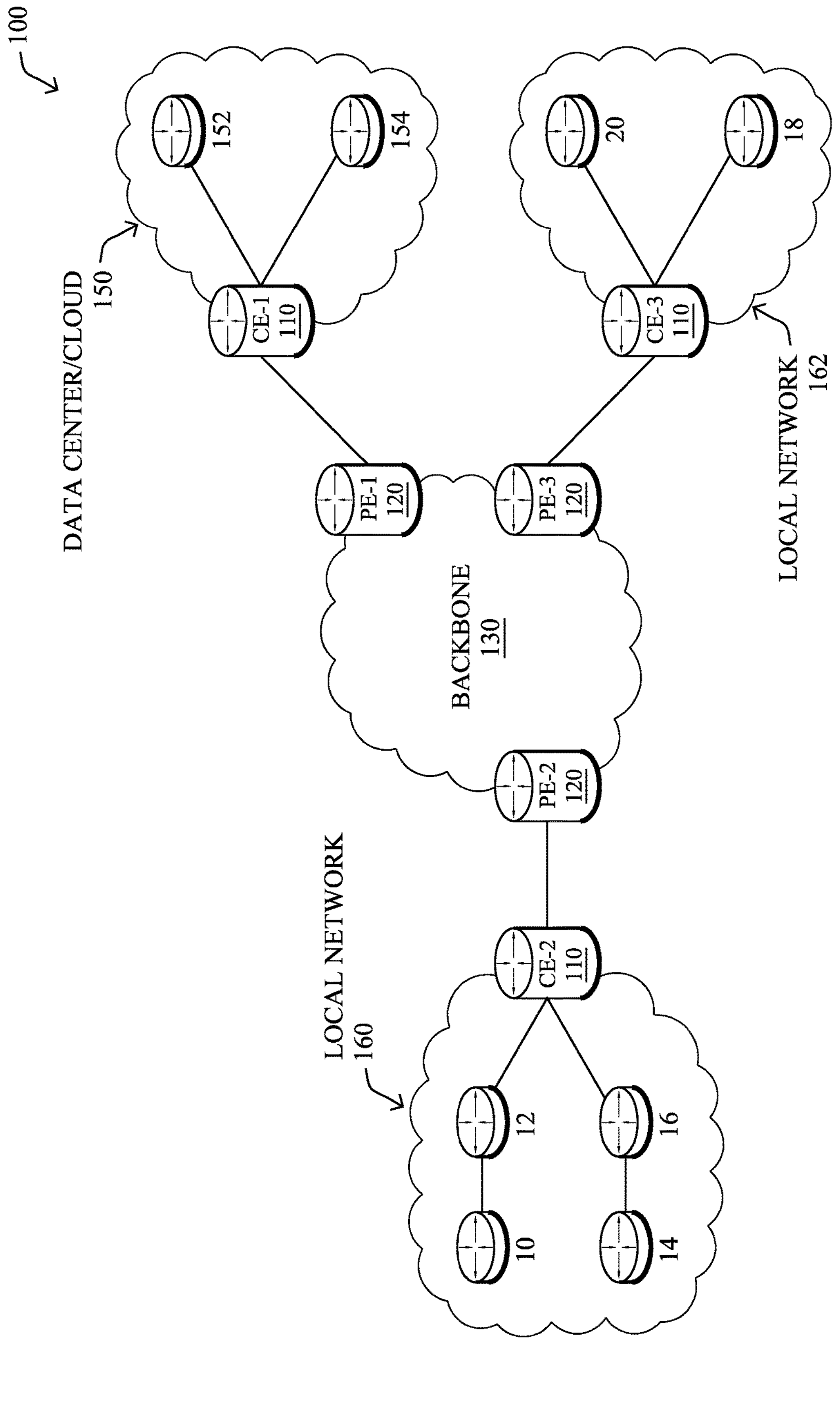

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
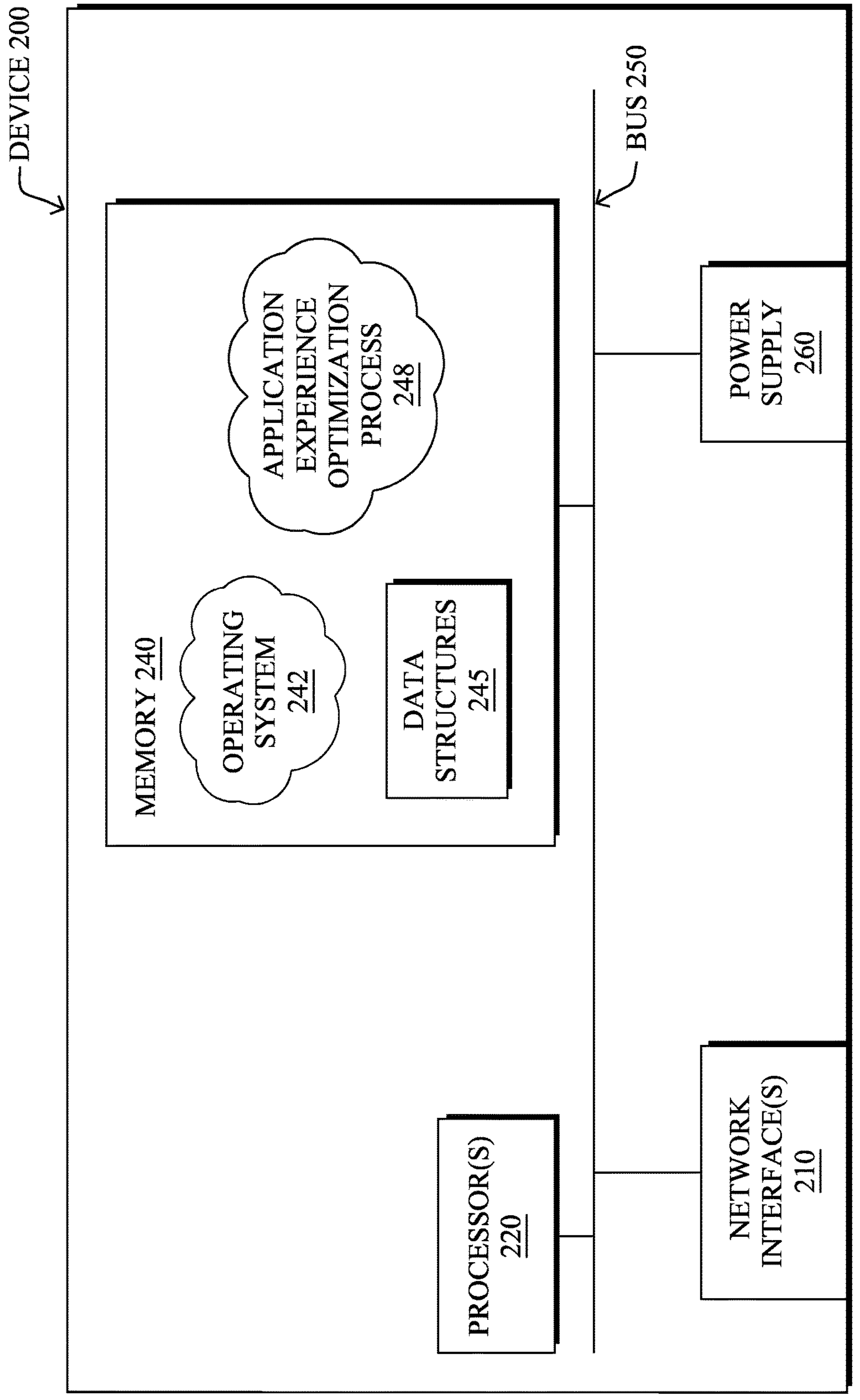
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 and/or data denoising process may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
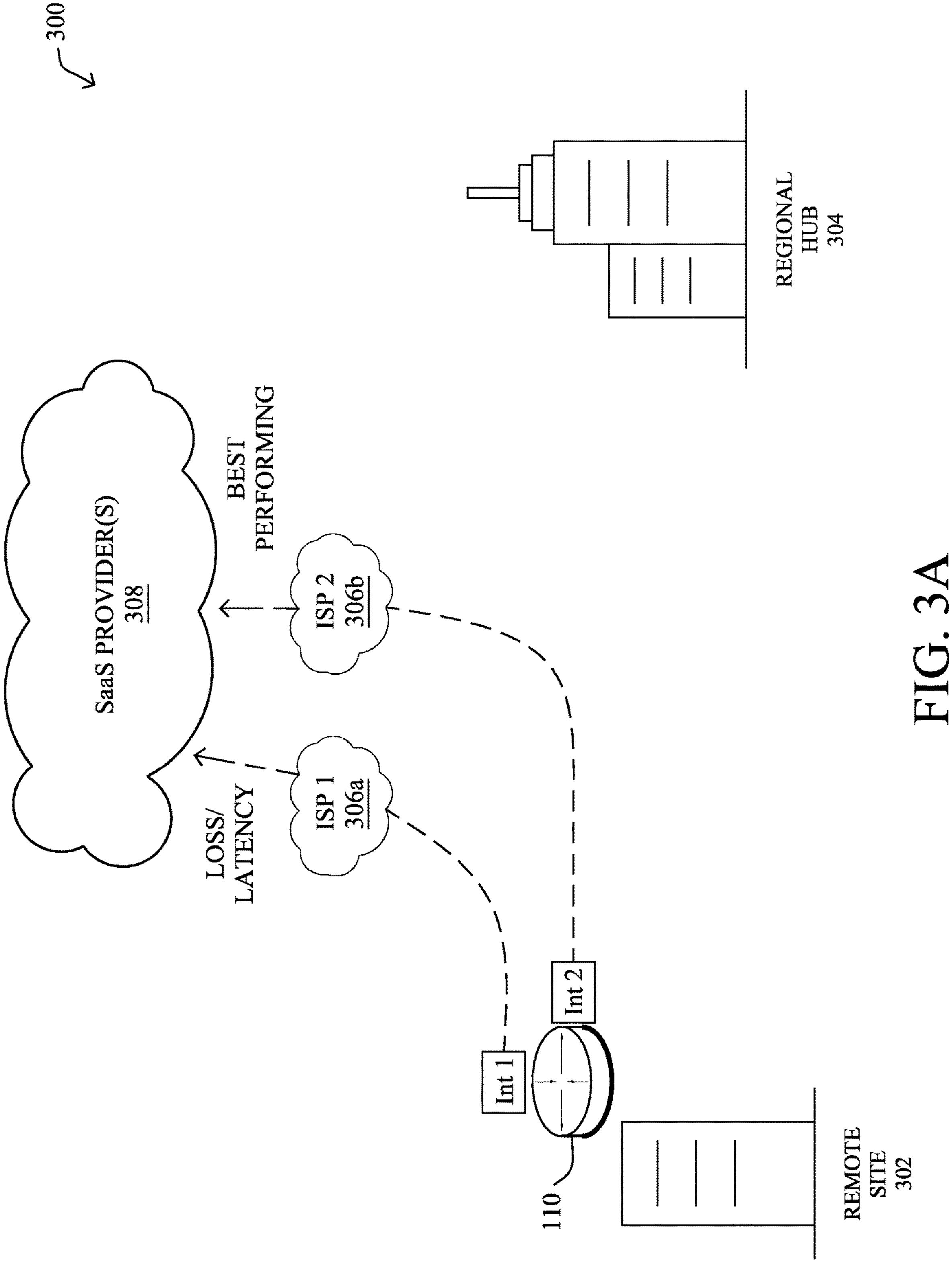
FIGS. 3A-3B illustrate example network deployments.
Figure 3B:
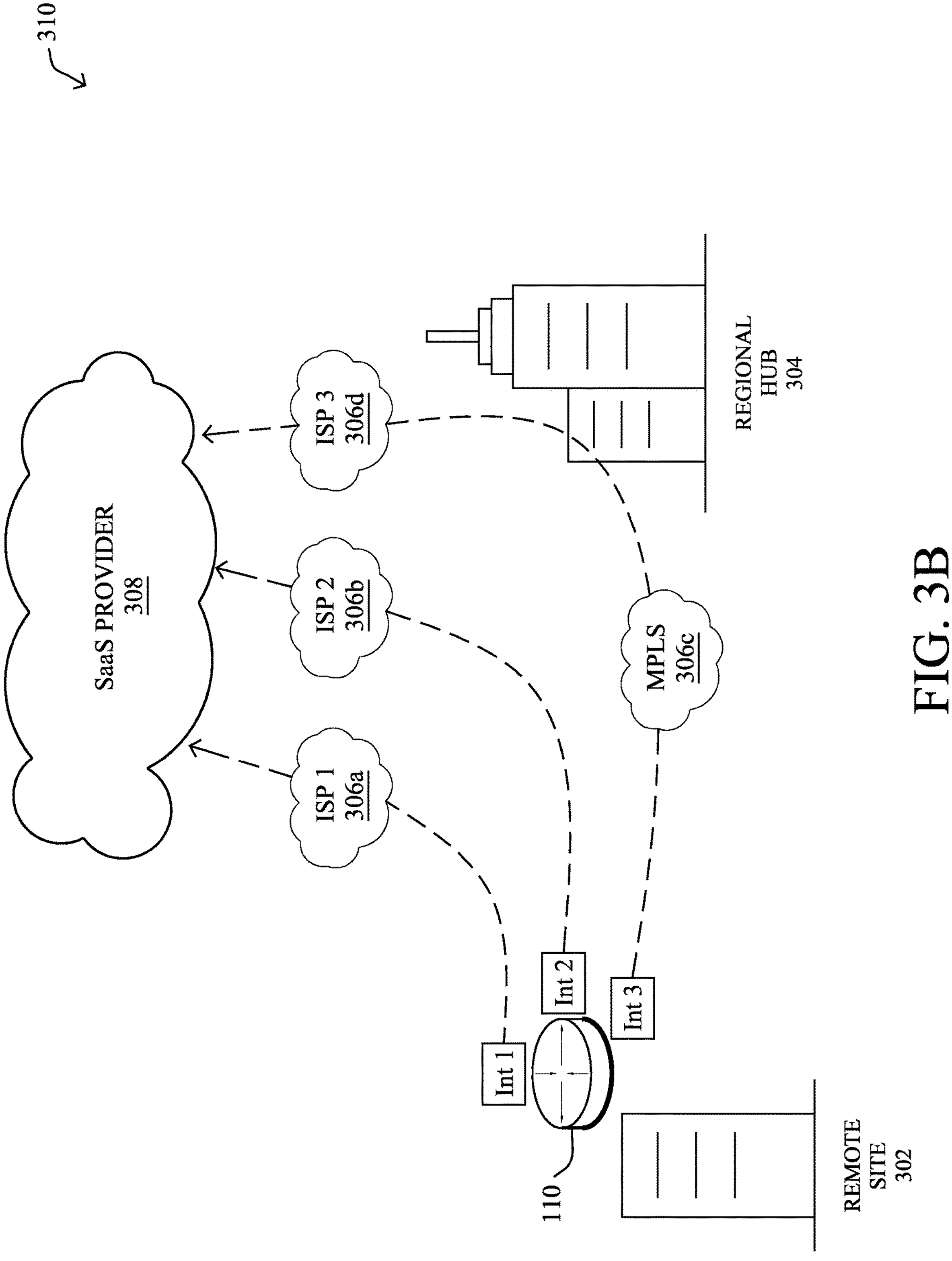

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider(s) 308 via another network, such as a third ISP 306*d*.

Regardless of the specific connectivity configuration for the network, a variety of access technologies may be used (e.g., ADSL, 4G, 5G, etc.) in all cases, as well as various networking technologies (e.g., public Internet. MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
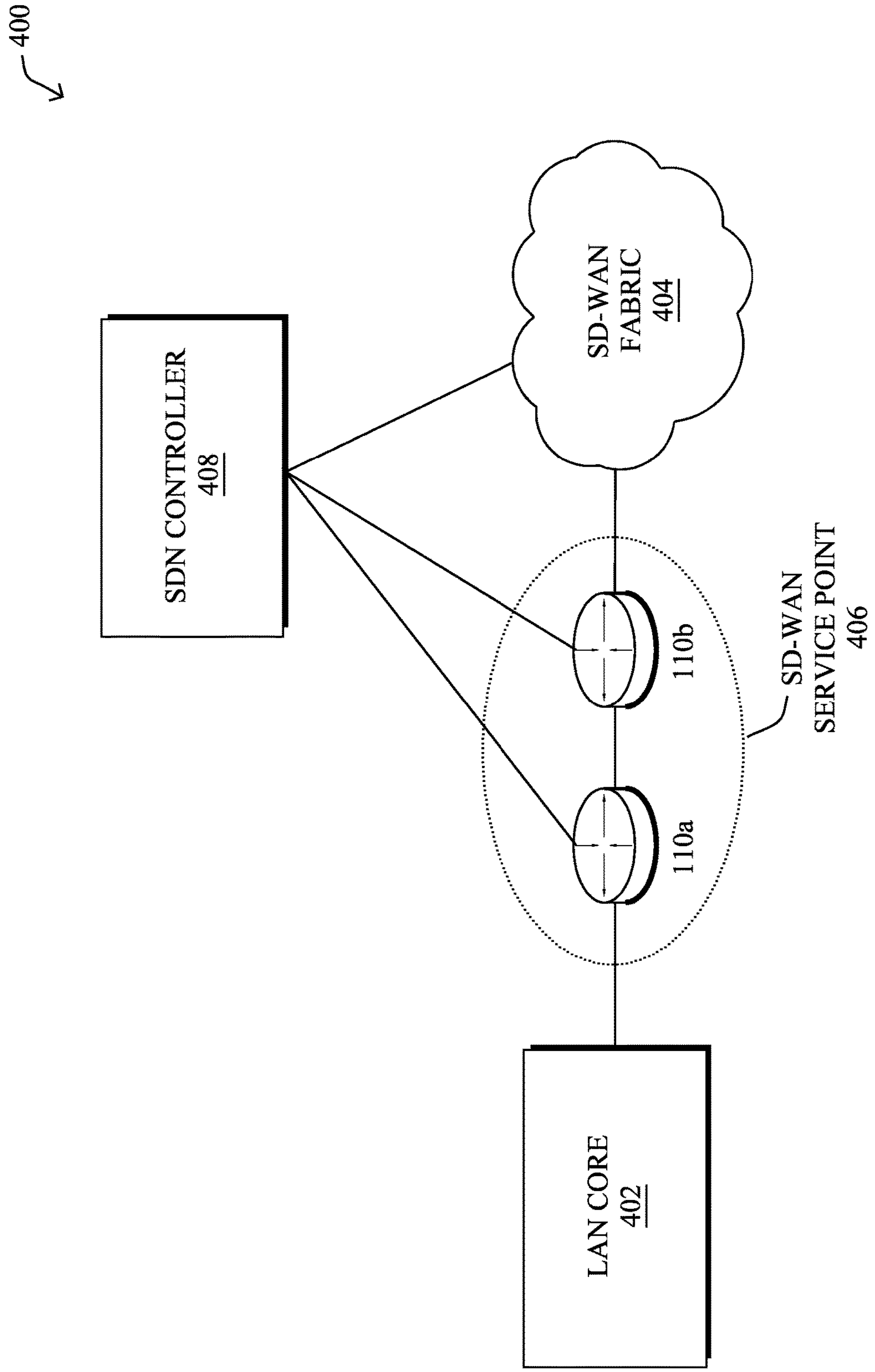
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region. SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path.' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HypefText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
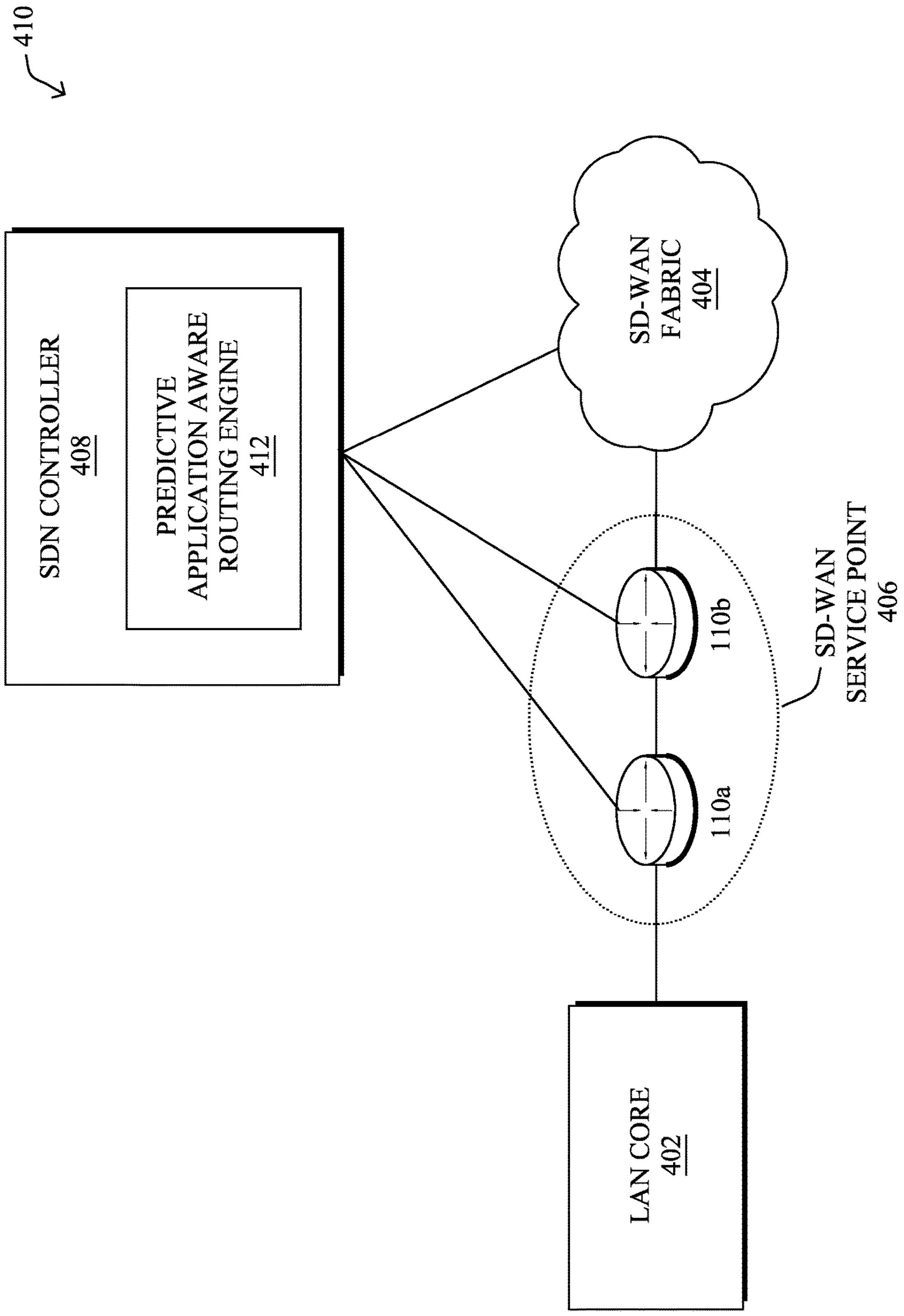

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, network probing is, by most standards, the method of choice to gain visibility into the so-called "application experience" for network owners. Technologies such as Application Response Time rely on traffic analysis (e.g., TCP control packets) to determine potential issues (e.g., detection of mitigation strategies in TCP indicating network congestion). Active probing strategies include Cisco IP SLA (Service Level Agreement), which endows routers and switches with the ability to run a variety of tests, ranging from simple Internet Control Message Protocol (ICMP) echo (ping) to full-blown HTTP tests and even File Transfer Protocol (FTP) downloads.

However, selecting the appropriate probing strategy for a network remains challenging. On one hand, selecting a probing frequency that is too slow may simply lead the system to miss a pattern that results in users perceiving a drop in the QoE of the application. On the other hand, performing probing at too high a frequency may also be unfeasible or inadvisable due to resource constraints in the network. Indeed, the more probes that are sent, the lower the bandwidth that is available for the traffic of the application and could even result in the probing itself causing degradation of its QoE, in some instances.

—Motif Signatures for Quality of Experience (QoE) Disruptions—

The techniques herein introduce the concept of QoE-impacting motif "signatures," which allows probing agents to detect QoE issues with a configurable degree of accuracy and without having to run probing at high frequencies that may be completely impractical on some devices (and some networks). As would be appreciated, such signatures are useful information for network operators seeking greater visibility and predictability with respect to the QoE of applications accessible via their networks.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device a device obtains a set of probing motifs. Each probing motif groups similar patterns of path probing results for one or more path metrics in a network. The device generates signatures for the set of probing motifs. Each signature relates a probing strategy with a measure of performance of a classifier to detect that motif were path probing to be conducted in accordance with that probing strategy. The device selects, based on the signatures for the set of probing motifs, a particular probing strategy to use in the network. The device causes one or more probing agents in the network to conduct path probing in accordance with the particular probing strategy.

Figure 5:
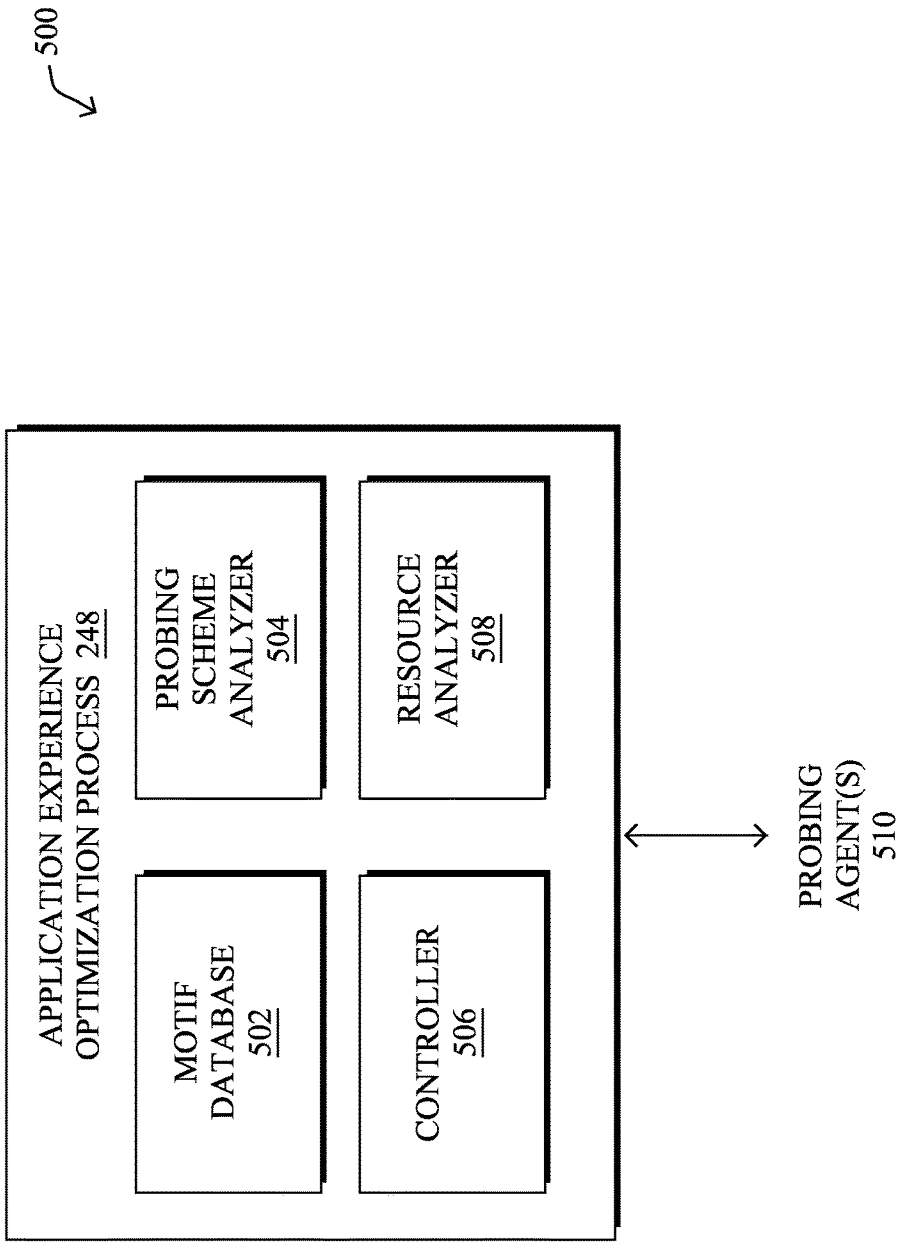
FIG. 5 illustrates an example architecture for computing motif signatures for quality of experience (QoE) disruptions.

FIG. 5 architecture for computing motif signatures for quality of experience (QoE) disruptions, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, or any other device in a network. In some embodiments, for instance, application experience optimization process 248 may be used to implement a predictive application aware routing engine, such as predictive application aware routing engine 412, or another supervisory service for the network.

As shown, application experience optimization process 248 may include any or all of the following components: a motif database 502, a probing scheme analyzer 504, a controller 506, and/or a resource analyzer 508. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

In various embodiments, motif database 502 may store a set of probing motfs, which may be identified by application experience optimization process 248 or obtained from another source. In general, a motif is a grouping of probing sequences, called 'snippets' hereafter, that share similar shape attributes/patterns, such as their extent in latency (min-max), the presence of brutal changes, spikes, oscillations, plateaus, etc. Such motifs could be identified, for instance, by applying machine learning, statistical, and/or timeseries analysis to the path probing results generated by a probing mechanism in a network.

Figure 6:
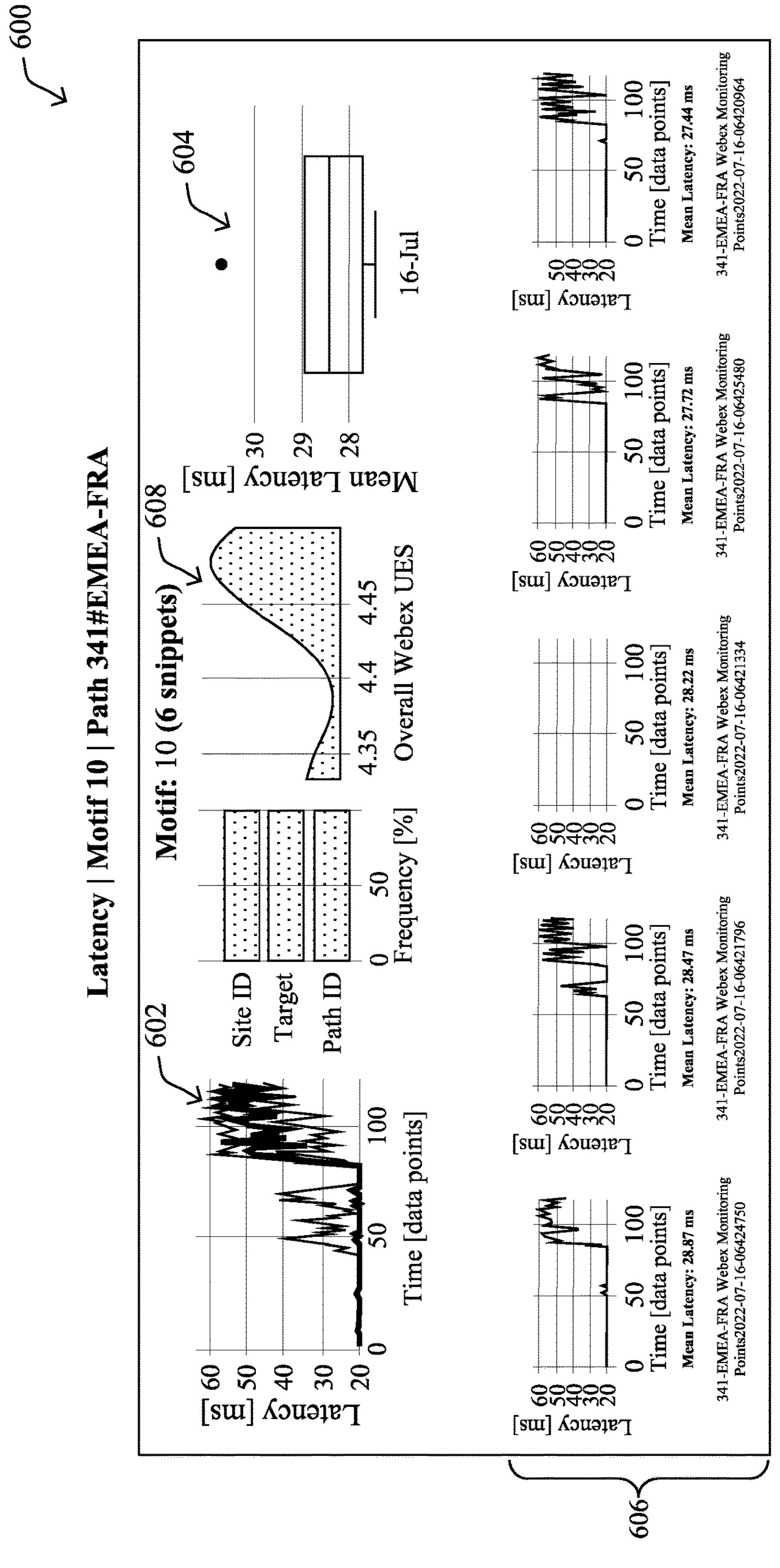
FIG. 6 illustrates an example probing motif for a network.

FIG. 6 illustrates an example probing motif 600 for a network, in some embodiments. As shown, probing motif 600 may be based on high-frequency probing (e.g., an interval of 100 ms) that measures the latency along one or more network paths via which application traffic for Webex is conveyed. Here, only the latency of each probe/data point are shown. However, lost probes are also important. At the bottom of probing motif 600 are example snippets 606, as well as their mean latencies. Motif 600 may also include a combined plot 602 of the snippets 606, also indicating the overall mean latency associated with probing motif 600. The mean latencies across snippets 606 may also be represented in plot 604. Finally, motif 600 may also include QoE information, which may take the form of a plot 608 of the user experience scores (UES) obtained from Webex, as detailed further below.

Referring again to FIG. 5, motif database 502 may obtained such motifs through any number of probing agents 510 distributed throughout the network sending high-frequency probes (e.g., 10 Hz or higher so ~100 ms frequency) along paths used by the traffic of the online application under scrutiny. In turn, application experience optimization process 248 may correlate these results with feedback from the corresponding users about their experience. If such correlations indicate that the motif has a significant negative impact on QoE, application experience optimization process 248 may add it to motif database 502, along with a score (e.g., UES) that represents the "magnitude" of the QoE impact. Said differently, a motif can be viewed as a local phenomenon that is known as being impactful for the user QoE.

In another embodiment, motif database 502 may associate each motif with a direct measurement of the QoE impact (e.g., a reduction of the voice MoS score by x %, an increase of the probability for the user to rate a call "Unacceptable" by y %, etc.). In such a case, motif database 502 may store the motifs as sets of tuples: (M_i, QI_i) where M_i is an array of KPI values at frequency F_i and QoE Impact (QI_i) represents the overall QoE impact of motif M_i for a given application).

In some embodiments, motif database 502 may also provide visualizations of the motifs in motif database 502 to a user interface for review, to help a network administrator better understand the relationships between different probing motifs/path behaviors and the QoE of a particular application.

Probing scheme analyzer 504 may be responsible for assessing whether a given probing strategy, which is often characterized by a probing frequency in Hz), is suitable for the detection of every motif of interest in motif database 502. In some embodiments, probing scheme analyzer 504 may do so using the following algorithm:

For each motif M_i in motif database 502 do:
- For each candidate frequency in [1, 0.1, 0.2, . . . , 0.01] do:
  - For each underlying snippet S of motif M_i do:
    - Sample underlying snippets at said frequency with different phase shifts.
    - Add these samples to a dataset D_i and mark them as positive.
- Augment D_i with negative samples from other, non-impacting, motifs.
- Train and evaluate a classifier to discriminate positive from negative samples in D_i.
- Store resulting classifier and its performance.

The outcome of this algorithm is a classifier C_{i,f} for each motif M_i and candidate frequency f, which may be referred to herein as a "motif signature" associated with a performance P_{i,f}, which is often expressed as a precision/recall tuple. In turn, probing scheme analyzer 504 may store this motif signature information for the motifs of interest in motif database 502. In a more complex embodiment of these signatures, whereby different frequencies are used at different times.

Alongside the signature and its performance, motif database 502 may also store additional metadata as well, such as the prevalence of the disruption/motif, possibly differentiated by country, type of uplinks (e.g., LEO satellite, ADSL, 5G, 4G/LTE), or ISP (Internet Service Providers). For instance, probing agents 510 may collect and report this information to probing scheme analyzer 504, either directly or indirectly.

Figure 7A:
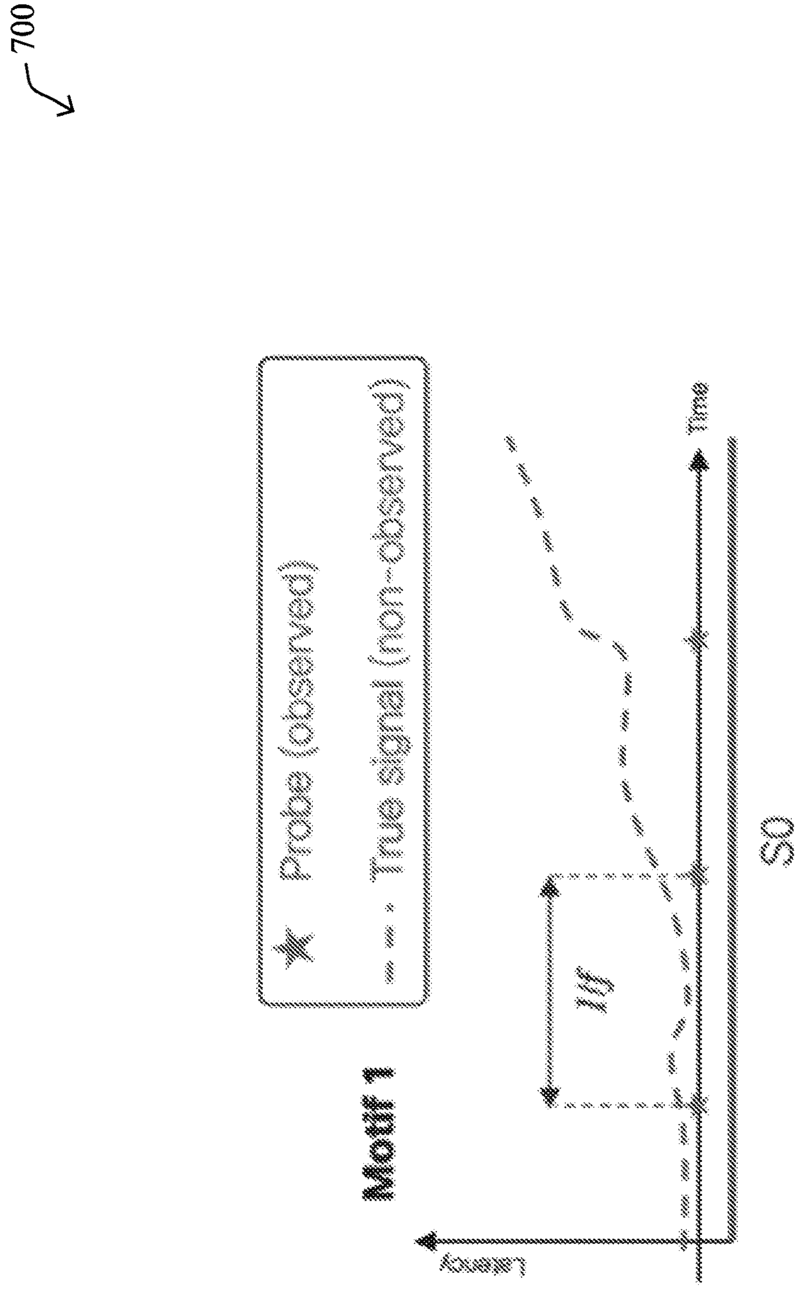
FIGS. 7A-7B illustrate example plots of probing motifs and possible motif signatures.
Figure 7B:
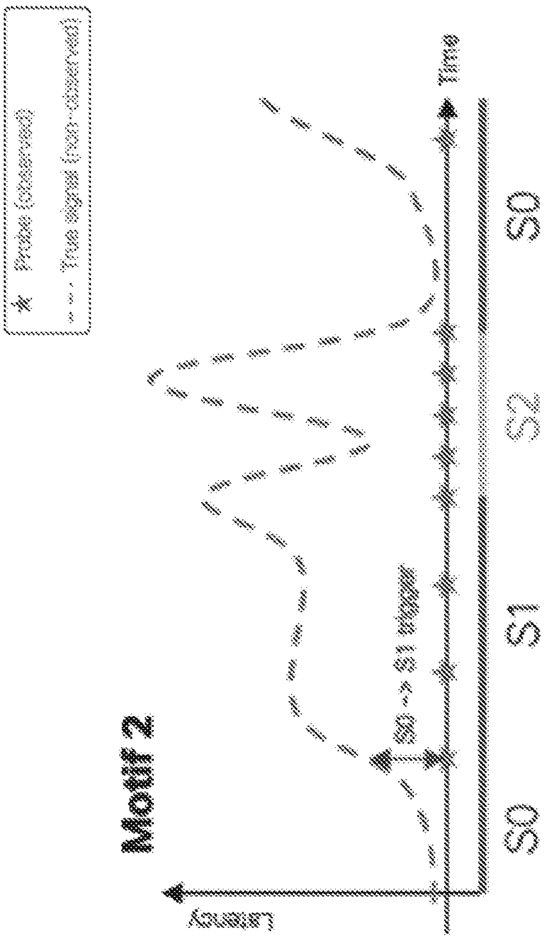

FIGS. 7A-7B illustrate example plots of probing motifs and possible motif signatures, in various embodiments. FIG. 7A shows a simple plot 700 of a first motif for the path latency over time. Here, the behavior of the latency in this motif is a simple, nearly monotonic, increase in latency, which can be easily detected using a fixed-frequency probing strategy, whose exact rate depends on the slope of the motif.

FIG. 7B, in contrast, shows a plot 710 of a second motif for the path latency over time. Here, the second motif requires a more complex probing strategy, with a base state S0 whose probing frequency is the same as for the motif in FIG. 7A, and two further states S1 and S2, which are triggered based on the outcome of previous probes. In this example, S1 and S2 feature probing frequencies that are twice and four times as large as S0, respectively, but these states are short-lived, thus making these increased frequencies acceptable for the network.

Referring again to FIG. 5, controller 506 may be responsible for exposing the contents of motif database 502 to the network operator via APIs and/or directly to a user interface. The operator may use it to configure policies of deployment at scale while constraining the probing traffic. For instance, the operator may specify a maximal probing rate of 0.05 Hz (20-second probing interval), and a minimal precision of 95% for detection of a given motif. In turn, controller 506 may generate a corresponding probing strategy in accordance with these requirements and the signatures computed by probing scheme analyzer 504. In turn, controller 506 may deploy the probing strategy to probing agents 510 for implementation.

Alternatively, the operator may select a region of interest (e.g., by country, interface colors, etc.) and request that controller 506 deploy a probing strategy that optimizes a given precision/recall tradeoff (e.g., an F1-score of 0.8, which is given by the formula: (Precision−Recall)/(Precision+Recall)).

In some embodiments, controller 506 may also select a probing strategy based in part on input from signature selector 508, which is responsible for determining which signatures could be used for a given motif considering the available resources (e.g., memory, CPU, bandwidth) in the network. As would be appreciated, each motif in motif database 502 may have more than one signature with a corresponding efficacy (and cost). Here, resource analyzer 508 may obtain information regarding the resources available at the devices executing probing agents 510 and/or other components of the network, to select the most appropriate probing strategy within the available resources.

Finally, probing agents 510 may receive the probing strategies from controller 506 (e.g., a set of one or more signatures, for instance) and use them locally by accumulating probing results in a buffer and querying. In addition, probing agents 510 may send the probing results back to application experience optimization process 248 or a local classifier for classification (e.g., for motif detection and, ultimately, the detection of degraded application QoE), such as at regular time intervals. In turn, the classifier may notify controller 506 of any QoE disruptions for reporting to the network operator and/or other components of the network. Alternatively, the executing devices of probing agents 510 detections may also locally perform path selection based on the probing results or, alternatively a network controller (e.g., predictive application aware routing engine 412 described previously) may use the probing results to perform the path selection).

Figure 8:
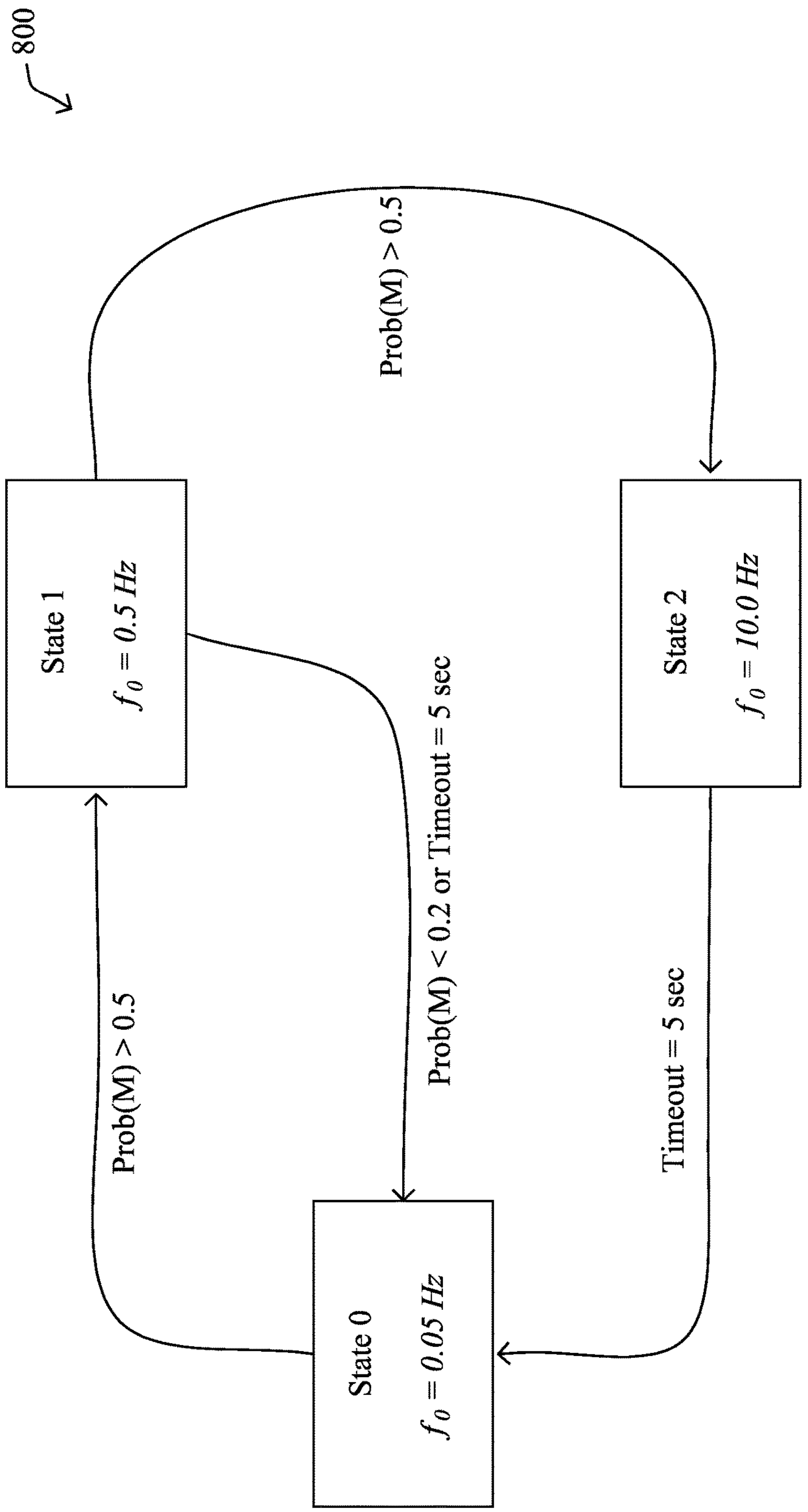
FIG. 8 illustrates an example finite state machine (FSM) encoding a path probing strategy.

In further embodiments, controller 506 may encode a given probing strategy as a finite state machine (FSM), which relaxes the notion of a fixed probing interval and allows for a multi-phase probing scheme whose states are associated with different probing intervals/frequencies. FIG. 8 illustrates an example FSM 800 encoding such a path probing strategy. As shown, FSM 800 may comprise three states: State 0, which is the "detection" state, which may be associated with a classifier with low precision and high recall, State 1, which may entail a more intensive, time-bounded, probing scheme, that is used to either quickly disqualify the motif (e.g., if Prob(M) is smaller than 20%) or move to a final stage (State 2) of very high-frequency probing (e.g., 10 Hz), used for high precision classification.

As probing agents 510 execute FSM 800, they may accumulate the probing results and pass them as input features to a predictive model whose predictions determine whether a state transition should be made. The advantage of such multi-phase probing strategy is that one there exists a lot more flexibility in the design and is more likely to achieve both high precision and high recall. However, as a tradeoff, the FSM-based approach also makes the entire probing process more complex, as doing so requires more advanced probing agents, and this complexity creeps into the deployment strategies offered to the network operator, since the assessment of the constraints is now multi-dimensional (base rate, max rate, etc.).

Lastly, the search space of probing scheme analyzer 504 increases exponentially with the number of allowed states of the FSM. In practice, though, the number of states and the allowed transitions can be constrained, thereby making the search more tractable, either systematically or using meta-heuristics.

Figure 9:
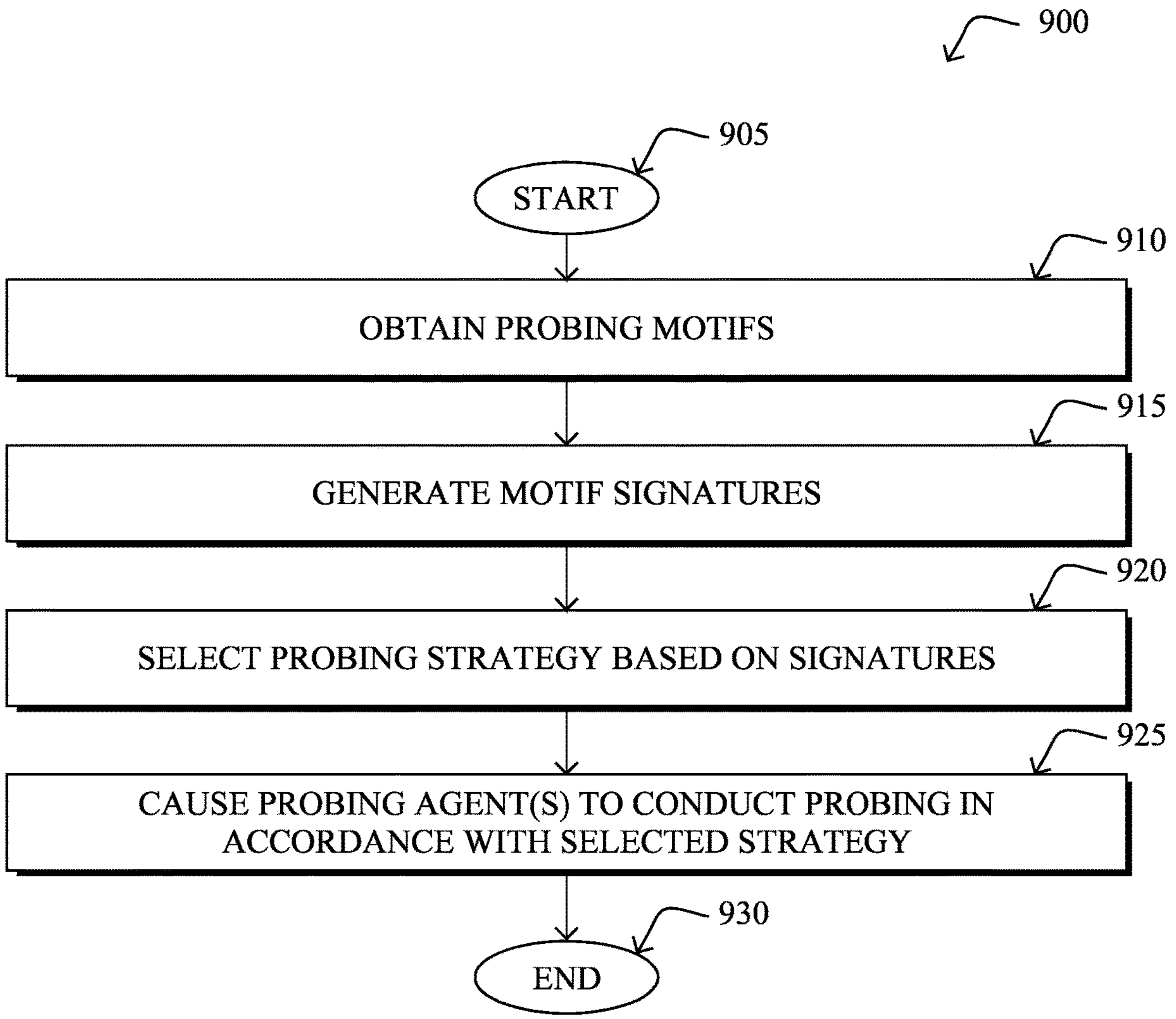
FIG. 9 illustrates an example simplified procedure for computing motif signatures for quality of experience (QoE) disruptions.

FIG. 9 illustrates an example simplified procedure 900 (e.g., a method) for computing motif signatures for quality of experience (QoE) disruptions, in accordance with one or more embodiments described herein. For example, a non-generic, specifically configured device (e.g., device 200), such as controller for a network (e.g., an SDN controller, a cloud-based device, etc.), an edge router, or other device in communication with a network, may perform procedure 900 by executing stored instructions (e.g., application experience optimization process 248). The procedure 900 may start at step 905, and continues to step 910, where, as described in greater detail above, the device may obtain a set of probing motifs. Each probing motif groups similar patterns of path probing results for one or more path metrics in a network. In various embodiments, the one or more path metrics comprise at least one of: delay, loss, or jitter.

In some embodiments, each of the set of probing motifs is associated with a corresponding impact to a quality of experience metric for a particular online application.

At step 915, as detailed above, the device may generate signatures for the set of probing motifs. In various embodiments, each signature relates a probing strategy with a measure of performance of a classifier to detect that motif were path probing to be conducted in accordance with that probing strategy. In some embodiments, the measure of performance comprises a recall or precision metric.

At step 920, the device may select, based on the signatures for the set of probing motifs, a particular probing strategy to use in the network, as described in greater detail above. In one embodiment, the particular probing strategy comprises sending path probes at multiple probing frequencies. In another embodiment, the device selects the particular probing strategy based on a defined policy that specifies a threshold for the measure of performance and a threshold probing frequency. In a further embodiment, receive the defined policy from a user interface.

At step 925, as detailed above, the device may cause one or more probing agents in the network to conduct path probing in accordance with the particular probing strategy. In some embodiments, the device may do so by sending a finite state machine that encodes the particular probing strategy to the one or more probing agents. In further embodiments, the one or more probing agents are executed by one or more edge routers in the network. In one embodiment, the device detects degradation to the quality of experience metric for the particular online application by using the classifier to detect a set of probing motifs from probing results captured by the one or more probing agents.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for computing motif signatures for quality of experience (QoE) disruptions, it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

obtaining, by a device, a set of probing motifs, wherein each probing motif groups similar patterns of path probing results for one or more path metrics in a network;

generating, by the device, signatures for the set of probing motifs by training and evaluating, for each probing motif and each candidate probing frequency, a classifier to discriminate first samples of the probing motif from second samples of non-impacting motifs, wherein each signature of the signatures relates a given probing strategy with a measure of performance of the classifier to detect each probing motif included in the set of probing motifs if path probing were to be conducted in accordance with the given probing strategy;

selecting, by the device and based on the signatures for the set of probing motifs, a particular probing strategy to use in the network; and causing, by the device, one or more probing agents in the network to conduct path probing in accordance with the particular probing strategy.

2. The method as in claim 1, wherein the one or more path metrics comprise at least one of: delay, loss, or jitter.

3. The method as in claim 1, wherein the measure of performance comprises a recall or precision metric.

4. The method as in claim 1, wherein the particular probing strategy comprises sending path probes at multiple probing frequencies.

5. The method as in claim 1, wherein the device selects the particular probing strategy based on a defined policy that specifies a threshold for the measure of performance and a threshold probing frequency.

6. The method as in claim 5, further comprising:

receiving, at the device, the defined policy from a user interface.

7. The method as in claim 1, wherein each of the set of probing motifs is associated with a corresponding impact to a quality of experience metric for a particular online application.

8. The method as in claim 7, further comprising:

detecting, by the device, degradation to the quality of experience metric for the particular online application by using the classifier to detect a set of probing motifs from probing results captured by the one or more probing agents.

9. The method as in claim 1, wherein causing the one or more probing agents in the network to conduct path probing in accordance with the particular probing strategy comprises:

sending a finite state machine that encodes the particular probing strategy to the one or more probing agents.

10. The method as in claim 1, wherein the one or more probing agents are executed by one or more edge routers in the network.

11. An apparatus, comprising:

one or more network interfaces;

a processor coupled to the one or more network interfaces and configured to execute one or more processes; and a memory configured to store a process that is executable by the processor, the process when executed configured to:

obtain a set of probing motifs, wherein each probing motif groups similar patterns of path probing results for one or more path metrics in a network;

generate signatures for the set of probing motifs by training and evaluating, for each probing motif and each candidate probing frequency, a classifier to discriminate first samples of the probing motif from second samples of non-impacting motifs, wherein each signature of the signatures relates a probing strategy with a measure of performance of the classifier to detect a given probing motif included in the set of probing motifs if path probing were to be conducted in accordance with the probing strategy;

select, based on the signatures for the set of probing motifs, a particular probing strategy to use in the network; and cause one or more probing agents in the network to conduct path probing in accordance with the particular probing strategy.

12. The apparatus as in claim 11, wherein the one or more path metrics comprise at least one of: delay, loss, or jitter.

13. The apparatus as in claim 11, wherein the measure of performance comprises a recall or precision metric.

14. The apparatus as in claim 11, wherein the particular probing strategy comprises sending path probes at multiple probing frequencies.

15. The apparatus as in claim 11, wherein the apparatus selects the particular probing strategy based on a defined policy that specifies a threshold for the measure of performance and a threshold probing frequency.

16. The apparatus as in claim 15, wherein the process when executed is further configured to:

receive the defined policy from a user interface.

17. The apparatus as in claim 11, wherein each of the set of probing motifs is associated with a corresponding impact to a quality of experience metric for a particular online application.

18. The apparatus as in claim 17, wherein the process when executed is further configured to:

detect degradation to the quality of experience metric for the particular online application by using the classifier to detect a set of probing motifs from probing results captured by the one or more probing agents.

19. The apparatus as in claim 11, wherein the apparatus causes the one or more probing agents in the network to conduct path probing in accordance with the particular probing strategy by:

sending a finite state machine that encodes the particular probing strategy to the one or more probing agents.

20. A tangible, non-transitory, computer-readable medium storing program instructions that cause a device to execute a process comprising:

obtaining, by the device, a set of probing motifs, wherein each probing motif groups similar patterns of path probing results for one or more path metrics in a network;

generating, by the device, signatures for the set of probing motifs by training and evaluating, for each probing motif and each candidate probing frequency, a classifier to discriminate first samples of the probing motif from second samples of non-impacting motifs, wherein each signature of the signatures relates a given probing strategy with a measure of performance of the classifier to detect each probing motif included in the set of probing motifs if path probing were to be conducted in accordance with the given probing strategy;

selecting, by the device and based on the signatures for the set of probing motifs, a particular probing strategy to use in the network; and causing, by the device, one or more probing agents in the network to conduct path probing in accordance with the particular probing strategy.

* * * * *